United States Patent [19]

Cullison

[11] Patent Number: 5,499,154

[45] Date of Patent: Mar. 12, 1996

[54] PROTECTIVE SHUT-DOWN SYSTEM FOR SWITCH-MODE POWER SUPPLY

[75] Inventor: Steven B. Cullison, Rancho Cordova, Calif.

[73] Assignee: Stewart Electronics, Rancho Cordova, Calif.

[21] Appl. No.: 359,602

[22] Filed: Dec. 20, 1994

[51] Int. Cl.⁶ .................................................. H02H 7/125
[52] U.S. Cl. .................................. 361/18; 361/86; 361/91; 363/53; 323/901
[58] Field of Search ................................ 361/18, 83, 86, 361/91; 363/53, 52, 56; 323/901

[56] References Cited

U.S. PATENT DOCUMENTS

| | | | |
|---|---|---|---|
| 3,670,234 | 6/1972 | Joyce | 361/18 |
| 4,254,443 | 3/1981 | Wilson, Jr. | 361/18 |
| 4,447,841 | 5/1984 | Kent | 363/56 |

*Primary Examiner*—Todd Deboer
*Attorney, Agent, or Firm*—J. E. McTaggart

[57] ABSTRACT

For overcurrent protection of a switch-mode power supply in a high power audio amplifier, an active feedback overload shut-down circuit acts though a control input of a PWM (pulse-width modulator) in the switch-mode power supply. In a multi-output switch-mode power supply, e.g. a dual-rectifier supply providing ±53 volts and ±100 volts suitable for a class H amplifier, instantaneous currents in each of the two rectifier circuits are monitored by primary windings of a current-sensing transformer, providing from its secondary winding a signal that is rectified and monitored by a comparator-timer for current overload at a predetermined threshold. The primary windings are made to have a particular turns ratio so as to proportion the protection sensitivity for each dc output voltage. Upon sensing overload from either rectifier circuit, the comparator-timer applies a shut-down signal to the PWM, shutting down the power supply safely for a predetermined time period, e.g. 17 seconds. Then a "soft" start-up is initiated; if the overload has been removed, normal operation resumes, otherwise another 17 second shut-down cycle is initiated and will repeat until the overload is remedied. The fast response of the overload protection also serves to protect the amplifier.

10 Claims, 2 Drawing Sheets

5,499,154

PROTECTIVE SHUT-DOWN SYSTEM FOR SWITCH-MODE POWER SUPPLY

FIELD OF THE INVENTION

The present invention relates to the field of audio electronics and more particularly it relates to an overcurrent protective system for a switch-mode power supply utilized in a high power audio amplifier.

BACKGROUND OF THE INVENTION

In the evolution to higher power levels in audio amplifiers, matters of weight, size, reliability, cost, etc., and their tradeoffs have had to be re-evaluated. Class H operation of the power stages has been utilized for increased efficiency, requiring a dual power supply delivering a main voltage supply (e.g. ±43 volts) and a higher auxiliary voltage supply (e.g. ±100 volts) that is called upon for additional headroom on peak power demands. Class H operation has been successfully utilized in high power audio amplifiers powered in the conventional manner from a basic 60 Hz transformer-type power supply. The main disadvantage of this approach is excessive weight and size, due mainly to the 60 Hz power transformer.

Weight and size reduction are available though the use of a "switch-mode" power supply, i.e. an AC/DC/ac/dc converter where the first AC to DC conversion from the 120 volt power line is transformerless, utilizing a full wave rectifier bridge to provide DC at about 170 volts. This powers a generator that supplies an HF (high frequency) ac output through a relatively small, lightweight HF transformer and bridge rectifier(s) supplying the output dc; this HF transformer, which can be made very light and small, serves to electrically insulate and thus isolate the ac input power line from the common ground of the power supply load (and of the amplifier) in order to prevent ground currents and eliminate shock hazard.

DISCUSSION OF RELATED KNOWN ART

FIG. 1 is a simplified functional block/schematic diagram of a switch-mode power supply 10 that represents known art, designed to provide two different ± output voltage levels, such as would be required by a high power class H audio amplifier. A full wave bridge rectifier 12 operating directly from the 60 Hz power line provides about 170 volts DC to power an HF generating circuit wherein HF drive pulses, originated in a PWM (pulse-width modulation module) 14, are applied by drivers 16A and 16B to two banks of FET switching devices 18 connected to the primary of HF transformer 20, which has a tapped secondary winding delivering HF at two voltage levels. These are rectified by a first full wave bridge rectifier 22 providing a first output voltage level, e.g. ±43 volts dc, and a second full wave bridge rectifier 24 providing a second output voltage level, e.g. ±100 volts dc.

PWM 14 includes an oscillator running at a frequency of about 55 kHz, and is typically implemented as an IC chip having one or more pulse-width control input nodes, such as PW1 and PW2 shown, at which the pulse-width can be varied from a DC control signal.

Such switch-mode power supplies typically include a comparator/regulator 26, as shown, in an active feedback loop sensing one or more of the output voltages and accordingly varying the pulse-width of PWM 14, e.g. via node PW1 as shown, for "tight" output voltage regulation as required in some fields of application.

Switch-mode power supplies require special attention to startup sequencing to avoid component stress: it is generally preferable to first apply the main supply power with the pulse-width of the PWM initially held at zero, and to then increase the pulse-width to its required working value in a slow smooth manner rather than abruptly. This can be accomplished by providing a user ON/OFF switch SW1 connected at a second control node of PWM 14, e.g. node PW2 as shown: capacitor C1 (47 uF) acts as an integrator in conjunction with an internal pull-up resistor or current source in PWM 14 to provide the desired "soft" start-up characteristic. A series resistor R7 (10 ohms) is provided to minimize degradation of the contacts of switch SW1 from sparking at turnoff. A thermal protective shut-down switch SW2 may be also be connected at node PW2 as shown.

A switch-mode power supply as described above achieves substantial reduction in weight and size compared an equivalent 60 Hz transformer-type power supply; however when applied to high powered audio amplifiers, switch-mode power supplies tend to be susceptible to a problem of vulnerability to current overload that has not been satisfactorily resolved heretofore.

The FETs 18 as switching devices are called upon to switch very high currents at high frequency; at the present state of FET technology, protection of the FETs against output overload or short circuiting is problematic. Despite best design practices such as providing several FETs 18 in parallel, e.g. in this instance, two banks of three, with isolating resistors R1–R6 to ensure balanced load-sharing, the FETs 18 typically operate close to their limits of voltage and current and particularly their maximum rated instantaneous power during switching transitions under conditions of maximum demand on the power supply corresponding to the power amplifier operating at or near its maximum output capability. Thus the FETs 18 are at risk of destruction from overloading of either of the two outputs, e.g. in the event of overloading or short-circuiting of the power amplifier output, since the thermal dynamics of the FET devices make it vitually impossible to dissipate the localized internal heat surge from an instantaneous power overload quickly enough to avoid destructive temperatures that develop very rapidly: in the order of a few microseconds.

Under field conditions, accidental overloading of audio amplifiers is not uncommon, e.g. by connecting too many loudspeakers in parallel to where the load becomes as low as one ohm or less, and/or unintended short-circuiting across the output terminals. The risk of failure increases with ambient temperature. Furthermore, in typical amplifiers where no regulation is provided for input line voltage variation, the risk increases toward the high end of the normally maintained power line voltage range, e.g. at 132 volts in a range of 120 volts ± 10%.

It is customary to provide a primary fuse or circuit-breaker and some form of thermal shut-down in high powered audio amplifiers; this is usually adequate for a power supply of the simple 60 Hz transformer type, however such ordinary passive protective measures alone are inadequate in switch-mode power supplies since they fail to respond quickly enough to save the FETs from destruction, thus additional special fast-response active measures are required for protection of the FETs.

The required protective shut-down speed in a switch-mode power supply is related to the clock rate: the protective shut-down system needs to respond to overload within two clock periods, i.e. within about 18 microseconds for a clock rate of 55 kHz. Even faster response in less than one clock period is preferable and has been accomplished by the present invention. Providing such a fast response time also serves to protect the amplifier; this is particulary beneficial for a class H amplifier.

Illustrative of an approach to the problem of switch-mode powers supply protection, U.S. Pat. No. 5,282,107 to Balakrishnan discloses a switch-mode power supply utilizing a power MOSFET safe operating area current-limiting device for switching the primary of the HF transformer.

U.S. Pat. No. 4,916,569 to Konapka testifies to the need for overcurrent protection in switch mode power supplies and more particularly the desirability of sensing overcurrent separately with regard to different output voltages when there are multiple independent output voltage levels. The Konapka patent discloses, in a switch mode power supply having an overcurrent protective circuit that detects overcurrent in the primary of the HF transformer and, on detecting overcurrent, shuts down the power supply via a PWM, the improvement comprising means for varying a reference voltage of a comparator in the protective circuit in response to a significant decrease of any of several output voltages due to overloading. Operation of the Konapka patent is based on an assumption of low inherent load regulation: a near-ideal power supply that delivers excessive current on demand with virtually no drop in output voltage would render the cited invention inoperable. The practicality of sensing output voltage drop as an indicator of current overload varies inversely with the inherent load regulation; practice of the invention would be confined to power supplies having low inherent regulation. Furthermore the circuitry disclosed in the Konapka patent fails to provide the necessary isolation between the ac input power line and the load common ground as described above.

OBJECTS OF THE INVENTION

It is a primary object of the present invention to provide an improved fast-acting protective circuit for protecting FET switching devices in the primary of a high frequency power transformer of a switch-mode PWM power supply in the event of output overload.

It is a further object to provide protective circuitry directed to a dual power supply for a high-powered audio amplifier operating in class H from dual supply voltages in the order of ± 43 volts and ± 100 volts, each derived by a separate full wave bridge rectifier, driven from a transformer whose primary is switched by FETs receiving PWM-controlled drive pulses.

It is a further object to provide in the protective circuit the capability of sensing current delivered to each of the two supply voltages for overcurrent at two respective threshold levels, and on sensing overcurrent in either supply, shutting down the power supply via the PWM.

It is further object that the overcurrent sensing and shut-down are to be performed quickly enough to protect the FETs and to also provide overcurrent protection to the amplifier, typically within a time period of two cycles of the high frequency switching rate.

It is a further object to provide in the protective circuit the additional capability of resetting and initiating a new "soft" start-up of the power supply automatically after a shut-down time interval of predetermined duration, in a manner that is fail-safe and that can repeatedly reset and initiate an additional timed shut-down period until the overload or short circuit has been remedied.

It is a further object to ensure that both manual and protective automatic means for start-up operate in a transition-controlled manner so as to avoid component overstress from transient disturbances.

It is a further object to apply the overload protection in a manner that preserves necessary isolation between the ac input power line and the load common ground.

SUMMARY OF THE INVENTION

The abovementioned objects have been accomplished in an active overload feedback shut-down circuit working in conjunction with a PWM in a switch-mode power supply. Instantaneous currents in each of the two rectifier circuits are monitored and, upon sensing overload in either rectifier circuit, a signal applied to the PWM shuts down the power supply quickly and safely for a predetermined period of time following which a "soft" start-up is initiated, then if the overload has been removed, normal operation resumes. The overload protection provides fast shut-down typically in less than one clock period (less than about 9 microseconds for a clock rate 55 kHz); this fast response also serves to protect the amplifier against overload damage.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
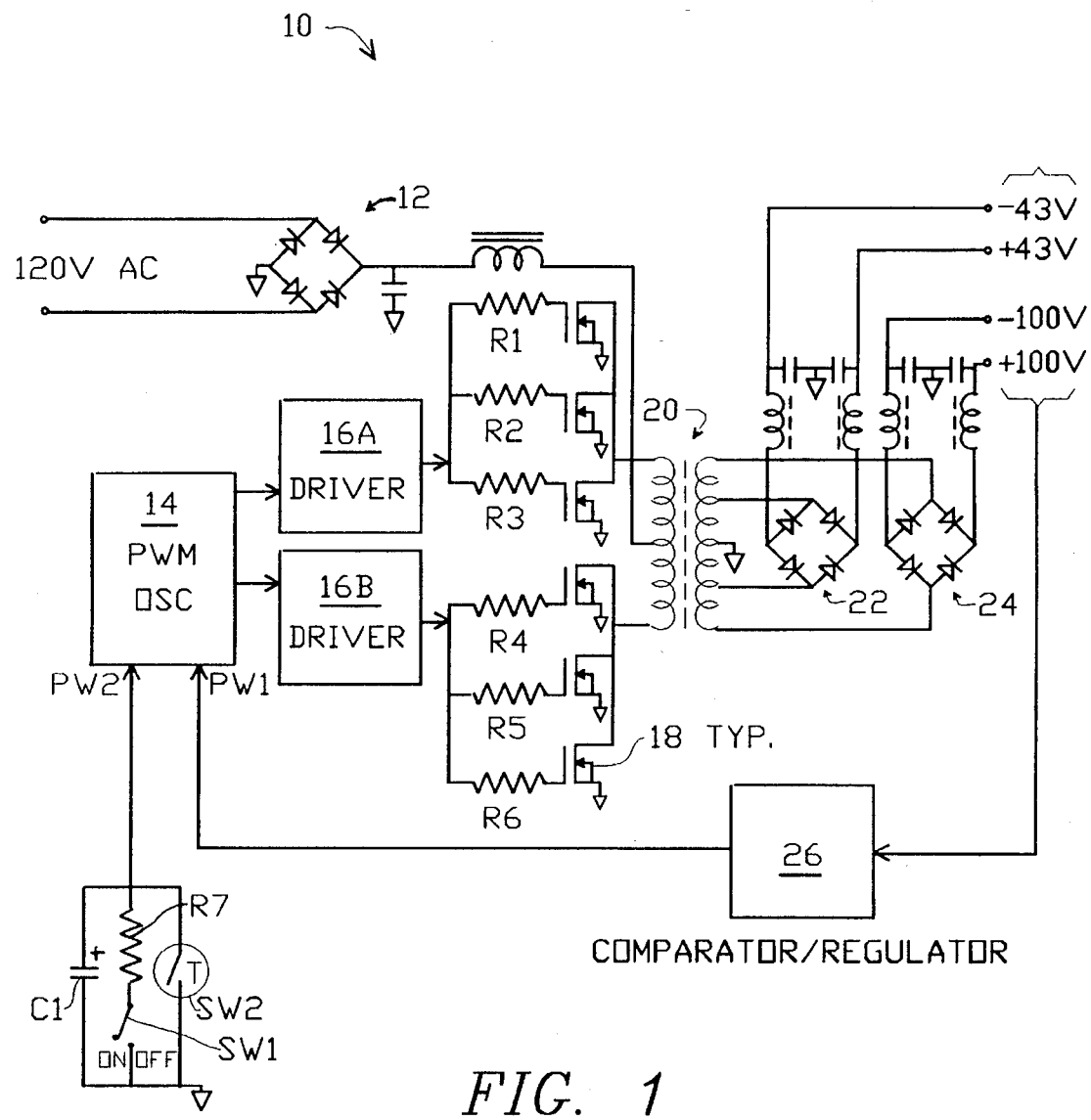
FIG. 1 is a schematic diagram showing a representative regulated switch-mode power supply of known art with active feedback regulation.
Figure 2:
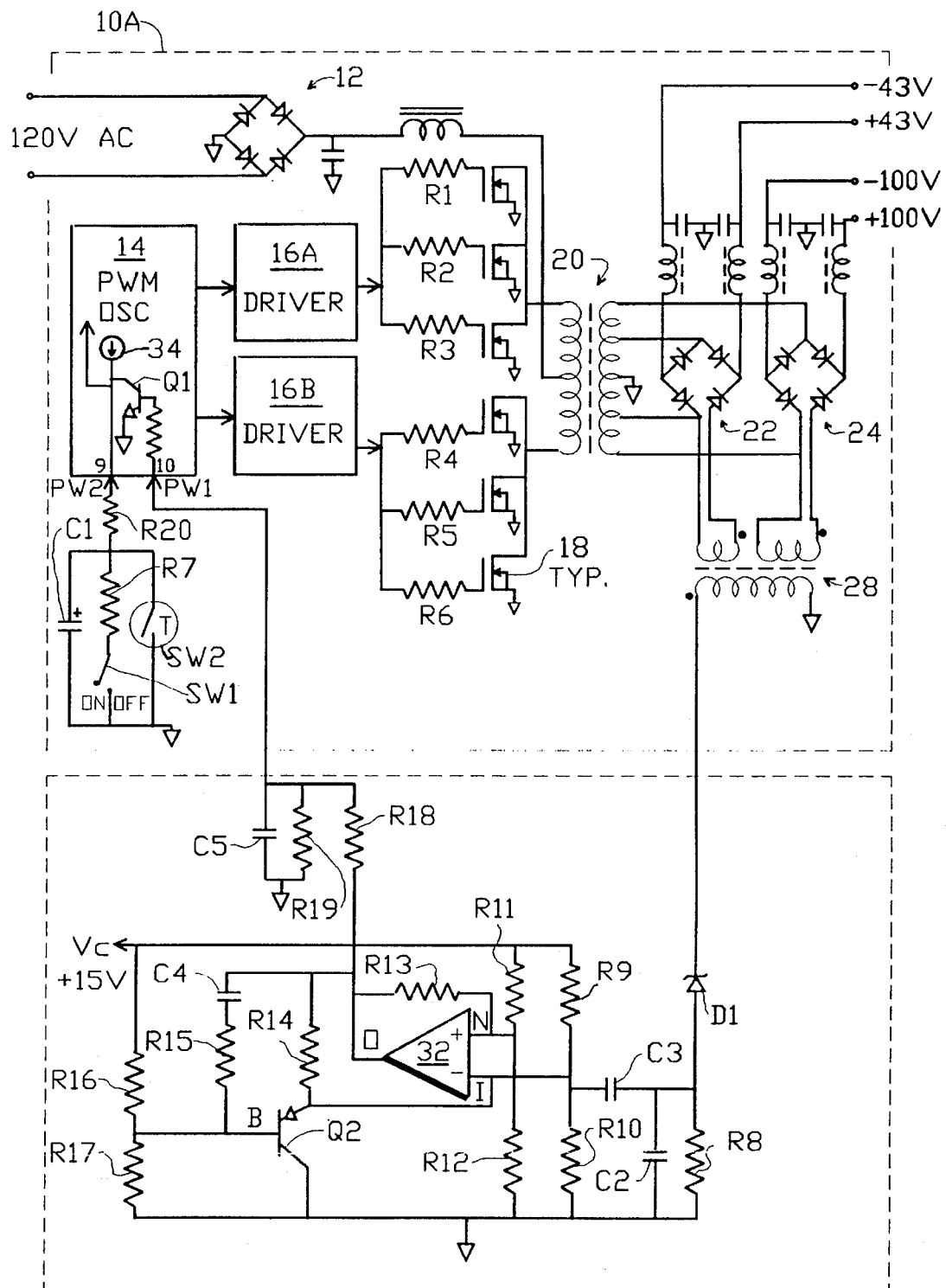
FIG. 2 is a schematic diagram showing the present invention as directed to a switch-mode power supply similar to that shown in FIG. 1, with the addition of an active protective feedback circuit.

With reference to FIG. 2, the circuitry in switch-mode power supply 10A will be seen as similar to that of power supply 10 in FIG. 1, but with the following modifications:

(1) elimination of comparator/regulator 26 so that, without active regulation, the power supply operates at its inherent degree of regulation;

(2) series connections to two diodes, i.e. one diode in each of the bridge rectifiers 22 and 24, to corresponding primary windings of a current sensing transformer 28 that transmits current amplitude data to an active feedback comparator in the protective circuit module 30 of the present invention;

(3) providing an overload shut-down control signal from module 30 as input to node PW1 of PWM 14; and (4) introduction of resistor R20 (300 ohms) in series with node PW2 of PWM 14.

Two primary windings of transformer 28 are connected each in series with a rectifier diode of a corresponding one of the bridge rectifiers 22 and 24 in the additive polarity indicated. The secondary winding of transformer 28 delivers to R8 (2.2 ohms) a rectified voltage representing a summation of the instantaneous rectifier currents of the two power supply output levels in a proportion determined by the number of turns in the windings of transformer 28. This proportion is predetermined to make the 43 volt supply more sensitive than the 100 volt supply so as to provide optimal overload protection to the FETs in the switching power supply as well as to the amplifier. The invention has been practiced successfully with a turns ratio of 2:1:100 for the first primary (43 volt supply), the second primary (100 volt supply) and the secondary, respectively, thus favoring the sensitivity of the first primary (43 volt supply) as described above.

This summed signal from the secondary winding of transformer 28 is a negative-going pulse at the switching rate (about 60 kHz) that is rectified by Zener diode D1 (1 N5236A, 7.5 volt) conducting in its forward direction to apply the rectified negative-going pulse to R8, paralleled by C2 (0.1 uF) to form a quasi-peak detector. In the reverse direction, Zener diode D1 acts to limit inverse transient voltage spikes generated by the release of stored energy from the core of transformer 28 in the switching and rectification process.

The signal developed across resistor R8 is coupled by capacitor C3 (220 uF) to the inverting input of comparator op-amp 32, whose input nodes N and I are biased by resistors R9, Ri0, R11 and R12 (75K, 13K, 511K and 150K respectively). Op-amp 32, which may be implemented by an IC type MC24C72F, is made to operate as a one-shot multivibrator with positive feedback through resistor R13 (61.9K).

The output of comparator 32, node 0, is applied to a voltage divider formed by resistors R18 (5.62K) and R19 (1.21K) so as to apply a shut-down control signal of suitable amplitude as input to pulse-width control node PW1 of PWM 14.

PWM 14 is implemented by an IC chip type SG3524: the selection of this IC chip is based on its superior immunity to high levels of r.f. impulse interference that necessarily exist within a switch-mode power supply. In type SG3524, nodes PW1 and PW2 are at pins 10 and 9 respectively. These nodes operate in a complementary manner, being connected internally to the base and collector respectively of an NPN transistor Q1 as shown, the collector being biased by a pull-up current source 34.

In the default mode, with the base (node PW1) near zero volts, transistor Q1 is thus held in a cutoff state with the collector (node PW2) pulled high by current source 34; in this condition PWM 14 operates in a normal mode providing pulses having pulse-width just under 50% duty cycle. Shut-down can be commanded manually, pulling down node PW2 to zero by an external switch such as ON/OFF switch SW1 or thermal switch SW2. Shut-down can also be commanded automatically by a positive DC control signal applied to node PW1, forcing base current to turn on transistor Q1 so that its collector pulls down node PW2. It is important to recognize that the response time of automatic overload shut-down via PW2 can be adversely affected by external circuitry connected to node PW1: for example capacitance connected directly between node PW2 and ground could slow down the shut-off time excessively and thus defeat the overcurrent protection. For this reason a resistor R20 (300 ohms) is inserted in series with node PW2 to preserve the protective shut-down response speed.

Capacitor C5 (0.001 uF) serves to by-pass node PW1 to eliminate unwanted pickup of stray noise and RF interference which are present at high levels within the switch-mode power supply 10A. However, the capacitance of C5 must be kept low enough to preserve the fast protective shut-down response time.

Under normal power supply operating conditions, the quiescent bias voltages on op-amp comparator 32 are made to be approximately 2 volts at input node N (non-inverting) and 3 volts at input node I (inverting), so that the output voltage at node 0 is normally low (near 0 volts), and thus has no influence on the PWM 14 as long as the detected voltage across R8 remains below the triggering threshold. Node B (base of transistor Q2) is biased at about 4 volts by R16 and R17, and since the emitter is connected to node I (at about 3 volts), transistor Q2 remains in a cut-off state during normal power supply operation.

When overload is sensed from either of the two bridges 22 sufficient to trigger the one-shot multivibrator 24 the output (node 0) of comparator 32 rapidly transitions to a high state and reduces the pulse-width to zero thus shutting down the power supply within a transition time of a few microseconds, quickly enough to save the FETs 18 from destruction.

The "on" period of the one-shot multivibrator, i.e. the shut-down time period, is made to be about 17 seconds, determined by the values of capacitor C3 and its charging resistance network consisting of resistors R9, R10 and particulary R14 (649K) whose upper terminal becomes pulled "high" (near the 15 volt supply) during the "on" period.

If the overload has not been removed by the end of the 17 second shut-down period, then the protective circuit will again immediately shut down the power supply as before, and the shutdown cycle will repeat safely until the fault is remedied or the input AC power line is shut off.

At the end of a shut-down period, PNP transistor Q2 becomes momentarily turned on via C4 (and R15, thus the emitter (node I) is forced downward near zero volts so as to discharge the timing capacitor C3 and thus reset the multivibrator in a manner to resume the current monitoring function with the correct threshold to provide the desired overload sensitivity immediately upon start-up.

The omission of any active feedback voltage regulation allows the switch-mode power supply to operate at an inherent degree of regulation that provides the class H amplifier with a "soft-limiting" mode when driven into signal overload, as opposed to "hard limiting" that would occur with tight regulation. Thus this invention allows a high power amplifier to operate reliably from a small lightweight switch-mode power supply and to perform dynamically in music applications at high peak levels with head room and overall performance similar to that of the same amplifier operating from a conventional 60 Hz transformer-type power supply that would be necessarily larger and heavier.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An overload protection circuit in a switch-mode power supply having a low frequency AC-DC portion powering a high frequency ac-dc portion that generates ac under control of a PWM (pulse-width-modulated) oscillator and that provides a dc output voltage from a rectifier circuit having at least one rectifier diode, said overload protection circuit comprising:

a current-sensing transformer having a first primary winding connected in series with the rectifier diode of the high frequency ac-dc portion of the power supply, and having a secondary winding;

a detector circuit, connected across the secondary winding, providing a detected DC signal proportional to sense current flowing in the diode; and a timing circuit, including an input comparator, receiving as input the detected DC signal, the comparator being made to have a threshold level corresponding to a predetermined current overload level of the detected DC signal and to actuate said timing circuit so as to generate as output a fast-rise shut-down signal of predetermined time duration in response to current overload as indicated by the DC detected signal exceeding the threshold level, the shut-down signal being applied to a control node of the PWM so as to control current overload shut-down and subsequent automatic start-up of the power supply.

2. The overload protection circuit as defined in claim 1 wherein the shut-down signal is made to have a short turn-off transition time in the order of two switching cycles of the switch-mode power supply, and to have a relatively long smooth turn-on transition characteristic that provides a "soft" start-up of the switch-mode power supply via the PWM so as to avoid component stresses.

3. The overload protection circuit as defined in claim 1 wherein the switch-mode power supply is made to provide additionally a second dc output voltage, each dc output voltage being supplied by rectification in a corresponding rectifier circuit having at least one corresponding rectifier diode, said overload protection circuit further comprising:

a second primary winding on said current transformer connected in series with the rectifier diode corresponding to the second dc output voltage, connected in additive polarity relative to the first primary winding, said second primary winding having a predetermined turns ratio relative to the first primary winding so as to provide a predetermined overload protection sensitivity allocated respectively to each dc output voltage.

4. The overload protection circuit as defined in claim 1 wherein the switch-mode power supply provides additionally a plurality of additional dc output voltages, each dc output voltage being rectified by a corresponding rectifier circuit having at least one corresponding rectifier diode, said overload protection circuit further comprising:

a plurality of additional primary windings on said transformer each connected in series with a corresponding rectifier diode of a corresponding one of the dc output voltages, connected in a manner to each operate in additive polarity relative to each other primary winding, said primary windings being made to have relative turns ratios such as to provide predetermined overload protection sensitivity allocated respectively to each dc output voltage.

5. The overload protection circuit as defined in claim 2 wherein current overload protection is made to shut down the switch-mode power supply within a time period of two clock cycles of the switch-mode power supply following a sensing of overcurrent by the detected DC signal exceeding the threshold level.

6. The overload protection circuit as defined in claim 2 wherein said timer is made to hold the switch-mode power supply shut down for a period of approximately 17 seconds following shut-down actuation of said protection circuit.

7. A method of providing overcurrent protection in a switch-mode power supply having a low frequency AC-DC portion powering a high frequency ac-dc portion that generates high frequency ac originating from a PWM (pulse-width-modulated oscillator) and that provides a dc output voltage being supplied by rectification in a rectifier circuit having at least one rectifier diode said method comprising the steps of:

(a) sensing current flow in the rectifier diode by means of a current-sensing transformer having a primary winding connected in series with the rectifier diode of the high frequency ac-dc nodeion of the power supply;, (b) detecting a signal from a secondary winding of the sensing transformer so as to derive a detected DC signal representing sensed current flowing in the diode;

(c) detecting overcurrent from the detected DC signal at a predetermined threshold level thereof in a comparator of a timing circuit, the comparator being made to actuate said timing circuit so as to generate as output a shut-down signal of fast rise time and designated time duration in response to current overload exceeding the threshold level; and (d) applying the shut-down signal to a control input node of the PWM oscillator so as to thus provide current overload shut-down and subsequent automatic start-up of the switch-mode power supply.

8. The method of providing overcurrent protection as defined in claim 7, further comprising in step (d) the sub-step of shaping the waveform of the shut-down signal so as to provide a prolonged start-up transition time in the signal as received by the PMW, thus providing "soft" start-up of the switch-mode power supply.

9. A method of providing overcurrent protection in a switch-mode power supply, for an audio amplifier, having a low frequency AC-DC circuit portion powering a high frequency ac-dc circuit portion that generates ac originating from a PWM (pulse-width-modulated oscillator) and that provides a plurality of dc output voltages each voltage being supplied by rectification in a corresponding rectifier circuit, in the ac-dc portion, having at least one rectifier diode, the dc output voltages being supplied to power the audio amplifier, said method comprising the steps of:

(a) sensing current flow in a rectifier diode of each rectifier circuit by means of a current-sensing transformer having a plurality of primary windings each connected in series with a corresponding rectifier diode in the rectifier circuit of a corresponding dc output voltage, and having a turns ratio relative to the other primary windings such as to allocate a predetermined overload protection sensitivity to the corresponding dc output voltage;

(b) detecting a signal from a secondary winding of the sensing transformer so as to derive a detected DC signal proportional to sensed current flowing in the diode;

(c) detecting overcurrent as indicated by the detected DC signal reaching a predetermined threshold level in a comparator portion of a timing circuit, the comparator portion being made to actuate said timing circuit so as to generate as output an "on" state shut-down signal of predetermined time duration in response to current overload exceeding the threshold level; and (d) applying the shut-down signal to a control input node of the PWM oscillator so as to thus control current overload shut-down and subsequent automatic start-up of the switch-mode power supply.

10. The method of providing overcurrent protection as defined in claim 9, further comprising in step (d) the sub-step of shaping the waveform of the shut-down signal so as to to provide a prolonged start-up transition time in the signal received by the PMW, thus providing "soft" start-up of the switch-mode power supply.

* * * * *